UNITED STATES PATENT OFFICE.

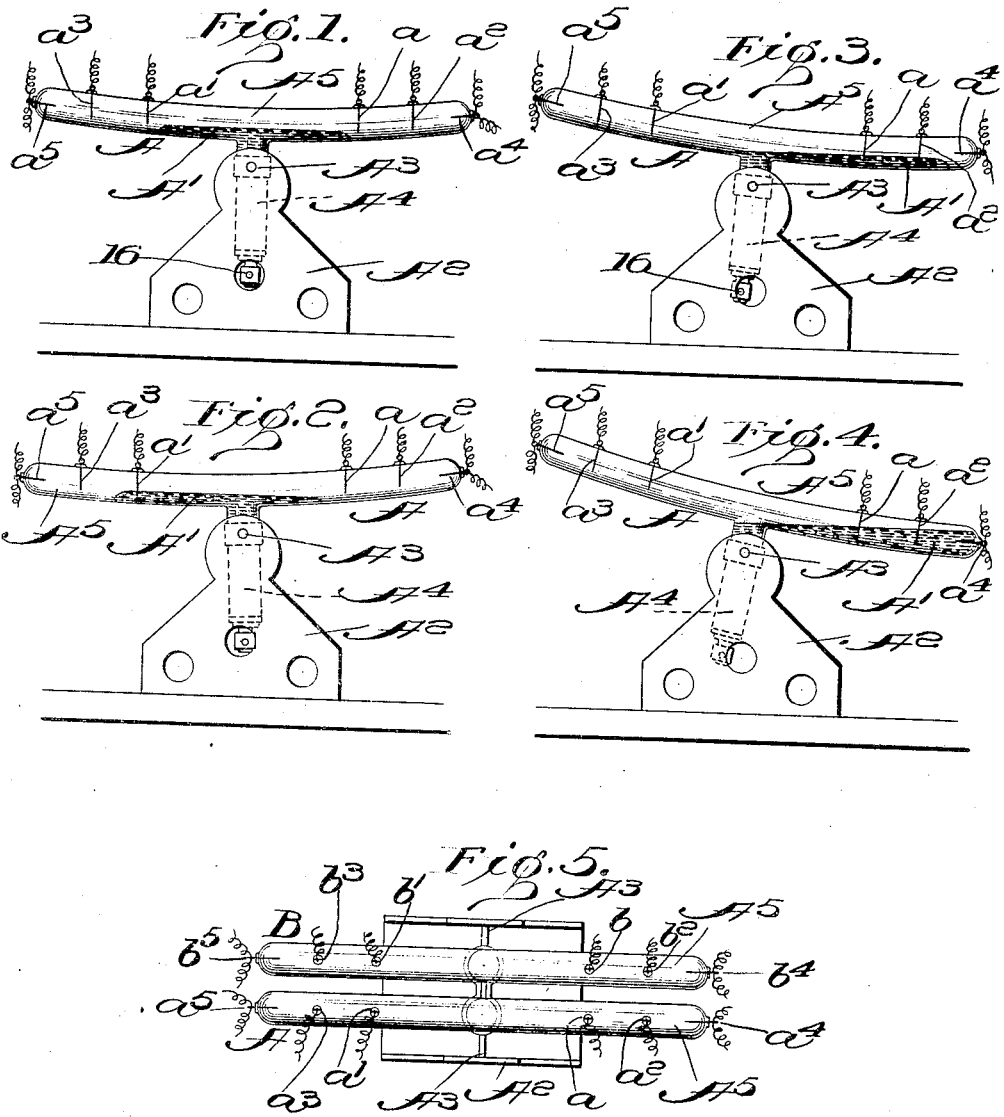

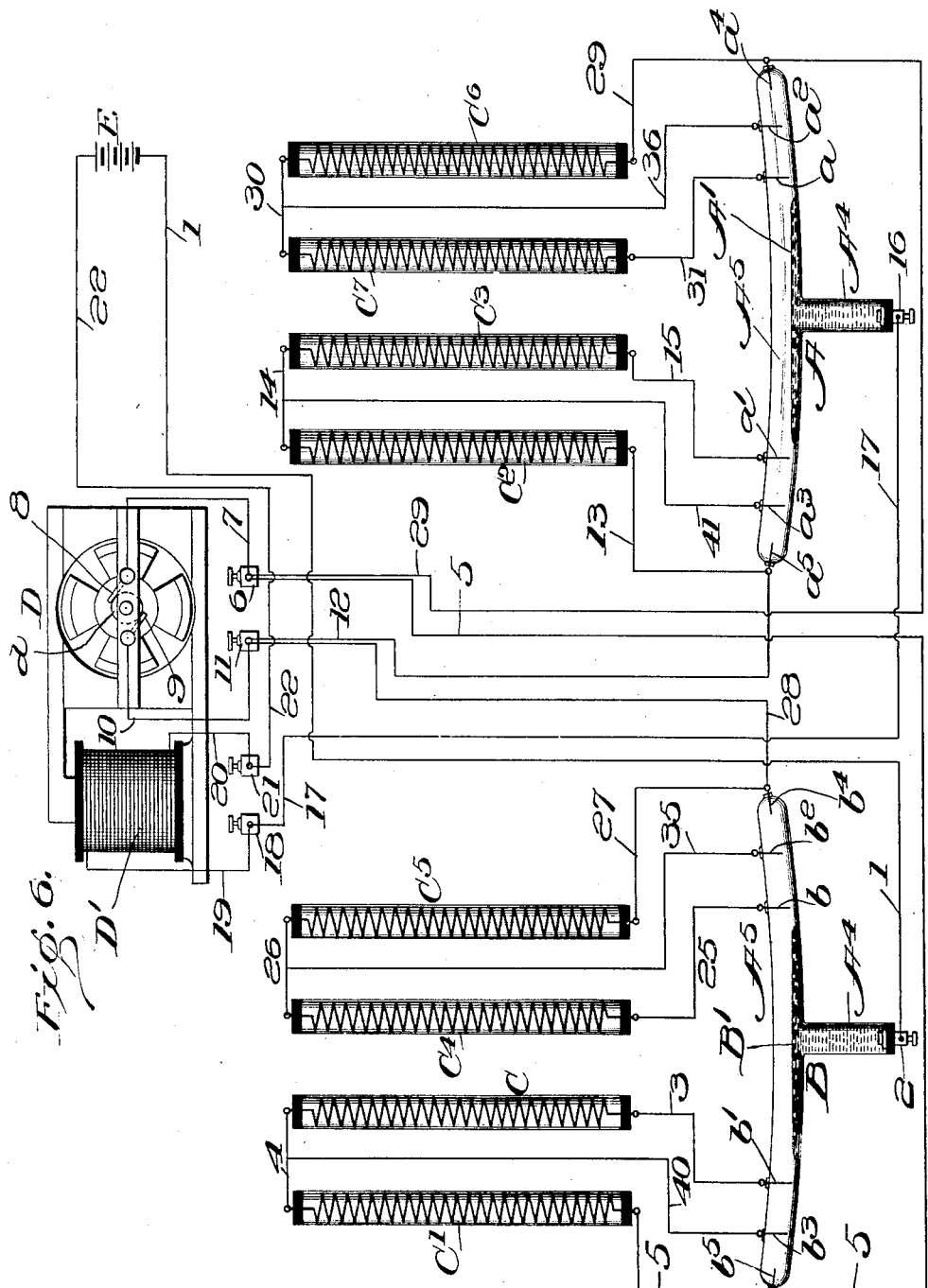

JOSEPH VARNUM MOTT, OF NEW YORK, N. Y.

ELECTRIC SWITCH AND SYSTEM OF CONTROL.

No. 898,766.

Specification of Letters Patent.

Patented Sept. 15, 1908.

Application filed February 2, 1907. Serial No. 355,385.

*To all whom it may concern:*

Be it known that I, JOSEPH VARNUM MOTT, a citizen of the United States, and a resident of the city, county, and State of New York, have invented certain new and useful Improvements in Electric Switches and Systems of Control, of which the following is a specification.

One of the objects of my invention is to provide a motor control adapted to start, stop, reverse or vary the speed of an electric motor automatically and cause it to accord in operation with the various requirements of use.

Another object is to produce an apparatus which will obviate or lessen the sudden jar when the speed of a motor is reversed or when the speed is changed.

Other objects will appear from the hereinafter description.

These objects are carried out by the apparatus hereinafter described.

The invention in its preferred form and as herein illustrated includes, in addition to the motor and a suitable source of electric energy, a plurality of partial circuits comprising different resistances and a plurality of gravity-controllable pivotally mounted switches which are operated synchronously and are each provided with a mobile conductor and a plurality of terminals respectively connected with the resistances; these parts bearing such coöperative relation with each other that movement of the switches will operate, through the mobile conductors and said terminals, to complete the circuit through the motor in either direction, according with the direction of movement of the switches, and to include in said circuit more or less resistance, or to exclude from said circuit all the resistance elements, according to the extent of movement of the switches.

Such a system as herein disclosed is especially adapted for use in situations wherein the parts are carried by a rolling or oscillatory means and are connected with and operate a device or element which it is desired to maintain in a predetermined position; the switch mechanism in such event being operated by the rolling or oscillatory movement of said means, to control the operation of the motor which in turn operates to maintain said device or element in its predetermined position. Thus, among other possible uses, may be mentioned its applicability to the maintenance in horizontal or level position, of tables or bunks on board a ship, notwithstanding the rolling or oscillatory movements of the vessel. In such event, the switch mechanism being turned pivotally by the movement of the ship, a distance proportionate to and in a direction according with such movement, will cause the motor to operate at a speed proportionate to the extent of the turning movement of the switch mechanism and in a direction according to that of the same, thus effectively counteracting the tendency of the table or bunk to tilt with the vessel, or restoring it to its level or horizontal position if it has lost the same when the vessel is tilted.

The invention consists in certain novel combination of parts and in certain peculiarities in the construction of elements substantially as hereinafter described and particularly pointed out in the subjoined claims.

The accompanying drawings illustrate a preferred embodiment of the invention, and in said drawings: Figure 1 is a side elevation of the switch mechanism showing the same in the position wherein it breaks the circuit to the motor. Fig. 2 is a similar view of the switch mechanism, showing the same tilted to one side and in its position wherein it closes the circuit in one direction through the motor and includes in said circuit all the resistance elements. Fig. 3 is a similar view of the switch mechanism, showing a position thereof wherein it closes the circuit in the reverse direction through the motor and cuts out a part of the resistance from said circuit. Fig. 4 is a similar view of the switch mechanism, showing it tilted in the same direction as in Fig. 3, but to a greater extent and excluding all resistance from the circuit. Fig. 5 is a plan view of the switch mechanism, and Fig. 6 is a diagrammatic view of the system.

The same characters of reference indicate the same parts in the several views.

The system comprises, as already stated, a suitable source of electrical energy, herein shown as a battery E, a suitable motor, as D, a plurality of partial circuits, comprising suitable resistances, herein shown as rheostats C, $C^1$, $C^2$, $C^3$, $C^4$, $C^5$, $C^6$ and $C^7$, and a switching mechanism adapted to complete said partial circuits, severally, and to include predetermined resistances therein, or to exclude all resistance therefrom, and also adapted to control and reverse the direction of flow of the current through the motor.

As herein shown, and as preferred, the switching mechanism comprises two members or switches A and B, pivotally mounted on a suitable base or standard $A^2$, at $A^3$ and adapted to be tilted by gravity in either direction from the horizontal. Each of these switches has a centrally disposed depending tubular leg $A^4$ and an upper or main tubular portion $A^5$ which projects laterally in opposite directions from said leg and is preferably slightly bent. The main portions of the members are provided on opposite sides of the axis of turning movement thereof with a plurality of terminals, of which those on one side are designated $a$, $a^2$, $a^4$, $b$, $b^2$, $b^4$, while those on the other side are designated $a^1$, $a^3$, $a^5$, $b^1$, $b^3$, $b^5$. Certain of these terminals are connected with the rheostats C to $C^7$, respectively, in such manner as to selectively include the latter in the circuits, while others of the terminals exclude all the rheostats from the circuits.

The rheostats referred to are mounted in pairs for each switch. Rheostats C and $C^1$ constitute one pair for the switch B; and rheostats $C^2$ and $C^3$ constitute the complementary pair for the switch A; while rheostats $C^4$ and $C^5$ constitute a second pair for the first mentioned switch B, and rheostats $C^6$ and $C^7$ constitute the complementary pair thereof for the second switch A. The rheostats C and $C^1$ are connected with each other by a wire 4 and the former is connected with the terminal $b^1$ by a wire 3. Rheostat $C^3$ is connected with the complementary terminal $a^1$, by a wire 15 and with rheostat $C^2$ by wire 14. Rheostat $C^4$ is connected with terminal $b$ by a wire 25 and with rheostat $C^5$ by a wire 26; and rheostat $C^7$ is connected with terminal $a$ by wire 31 and with rheostat $C^6$ by wire 30.

There are certain electrical connections of the switches with each other and the battery and motor, illustrated in the drawings and hereinafter pointed out in detail, whereby in connection with the arrangements just described, the rheostats C, $C^1$, $C^2$ and $C^3$ are connected in series when the circuit is completed through the terminals $b^1$ and $a^1$, thus operating the motor in one direction, and at a comparatively low speed because of the relatively high resistance thus included in the circuit; and whereby further the rheostats $C^4$, $C^5$, $C^6$ and $C^7$ are connected in series, to run the motor in the reverse direction and at a similarly low speed, when the circuit is completed through the terminals $b$ and $a$.

The terminals $b^3$ and $a^3$ are respectively connected with the rheostats $C^1$ and $C^2$ by wires 40 and 41; and terminals $b^2$ and $a^2$ are respectively connected with rheostats $C^5$ and $C^6$ by wires 35 and 36. Thus, when the circuit is completed through terminals $b^3$ and $a^3$ the resistances C and $C^3$ are shunted, increasing the speed of the motor, and this is similarly true when the circuit is completed through terminals $b^2$ and $a^2$, the corresponding resistances $C^4$ and $C^7$ being then cut out of the circuit. The other terminals $a^4$ and $a^5$, and $b^4$ and $b^5$ are illustrated as arranged at the ends of the main tubular members of the switches, and are so arranged in the circuit connections that when the circuit is completed through one pair, as $a^4$ and $b^4$, all the described rheostats will be cut out and the motor will be caused to run in one direction at a relatively high speed; and when the circuit is completed through the other pair, $a^5$ and $b^5$ all the described resistances will be cut out of the circuit and the motor will be caused to run at a high speed in the direction opposite to that just referred to.

In the form of switches herein illustrated it is desirable or necessary to employ a suitable conducting means of mobile character, such as mercury, for completing the circuit through the various terminals. Such a conducting element or means is illustrated at A' and B' in the respective switches, and it fills the legs $A^4$ thereof and extends up into the same to a predetermined level which is such that when the switches are in their normal or level positions the mobile conductors will be free of contact with any of the terminals, the circuits at this time being open and the motor at rest. Should, however, the switches be tilted the conductors A' and B' will be caused thereby to flow in their respective tubes to one or the other side, according to the direction of such tilting movement, and will successively make contact with all, or only certain, of the terminals at the side towards which the switches have been tilted, according to the extent of such movement. Extending into the mercury are terminals from binding posts 2 and 16, respectively, the former of which is illustrated as connected with the positive pole of the battery E by means of a wire 1 while the latter is shown in the diagram as connected with the field magnet D' of the motor D by wires 17 and 19 and binding post 18. To avoid or reduce liability of sparking, the air may be exhausted from the tubular portions of the switches.

It is to be understood that the number of terminals shown is merely illustrative and may be reduced or increased without departing from the spirit of the invention, and that the details shown, even though restrictively described, are not essential to the invention in the broad aspect thereof in which the same is set forth in some of the subjoined claims. Such details, however, illustrate what I now regard as the preferred embodiment of my invention and are advantageous. They are, therefore, included in others of the subjoined claims.

The operation of the device is as follows: When the switch mechanism is in what may be arbitrarily termed a normal position, herein shown as horizontal, all of the circuits are partial only, the mobile conductors being in contact with none of the terminals. None of the circuits to the motor being complete the latter remains idle. Now assuming that this condition of equilibrium of the switch mechanism is destroyed by its being tilted towards the left hand a distance which immerses the terminals $a^1$ and $b^1$ in the mobile conductors A' and B', the circuit through the motor will be completed as follows: Leaving the positive pole of the battery E by way of the wire 1, the current travels to the binding post 2 on the switch B, thence through the mobile conductor B' to the terminal $b$, and by way of the wire 3 to the rheostat C and through the same and by the wire 4 to the rheostat $C^1$; thence by the wire 5, binding post 6 and wire 7 to the upper brush 8 of the motor D, and, by way of the commutator $d$ and lower brush 9 and wire 10, to the binding post 11; thence by the wires 12 and 13 it flows to the rheostat $C^2$, which it leaves by way of the wire 14 and flows through the rheostat $C^3$, from which it traverses the wire 15, terminal $a^1$, mobile conductor A', binding post 16, wire 17, binding post 18, wire 19, field magnet D', wire 20, binding post 21 and wire 22, back to the battery E. If, however, the direction of tilting movement of the switch mechanism be to the right, instead of to the left, to the extent immediately above referred to, so as to produce contact between the mobile conductors A' and B' and the terminals $a$ and $b$ only, the course of the current will be as follows: Leaving the battery by way of the wire 1, the current flows to the binding post 2, thence by way of the mobile conductor B' to the terminal $b$, by wire 25 to rheostat $C^4$, through the latter and by wire 26 to rheostat $C^5$, thence by wires 27 and 28 to binding post 11, thence by wire 10 to the lower brush 9 of the motor, thence by commutator $d$, brush 8 and wire 7 to binding post 8; thence by wire 29 to rheostat $C^6$, thence by wire 30, rheostat $C^7$ and wire 31 to terminal $a$, and through the mobile conductor A', binding post 16, wire 17, binding post 18, wire 19, magnet D', wire 20, binding post 21 and wire 22 to the battery. In either case the motor is run at a relatively low speed, including in the circuit four resistance elements, but in the two cases it runs in opposite directions with respect to each other, the direction of the current being in reverse directions through the same. Thus, in the first assumed example, the rheostats C, $C^1$, $C^2$ and $C^3$ are included in the circuit, and the current flows through the motor from brush 8 to brush 9; while in the second example, the rheostats $C^4$, $C^5$, $C^6$ and $C^7$ are included in the circuit and the direction of flow of current through the motor is from the brush 9 to the brush 8. Now, assuming that the movement of the switches to the right continues until the terminals $a^2$ and $b^2$ also are immersed in the mobile conductors A' and B', it will be apparent that the rheostats $C^4$ and $C^7$ are cut out of the circuit, thus reducing the resistance and increasing the speed of the motor proportionately to the increased degree of tilting or extent of movement of the switches. In this position of the parts the current reaches the brush 9 of the motor by way, successively, of wire 1, binding post 2, mobile conductor B', terminal $b^2$, wire 35, rheostat $C^5$, wires 27 and 28, binding post 11 and wire 10; and from the brush 8 of the motor it flows back to the battery passing, successively, through wire 7, binding post 8, wire 29, rheostat $C^6$, wire 30, wire 36, terminal $a^2$, mobile conductor A', binding post 16, wire 17, binding post 18, wire 19, magnet D', wire 20, binding post 21 and wire 22. Similarly, if the direction of tilting of the switches be to the left, and such that the terminals $b^3$ and $a^3$, instead of the terminals $b^2$ and $a^2$, be immersed, the rheostats C and $C^3$ will be cut out of the circuit, the current in such case flowing as follows:— over wire 1 to post 2, through mobile conductor B' to terminal $b^3$, through wires 40 and 4, rheostat $C^1$, and wire 5 to binding post 6; through wire 7 to brush 8, through commutator $d$ to brush 9, through wire 10 to binding post 11, through wires 12 and 13, rheostat $C^2$, wires 14 and 41, terminal $a^3$, mobile conductor A', binding post 16, wire 17, binding post 18, wire 19, magnet D', wire 20, binding post 21 and wire 22 to battery. Now, if such movement of the switches in either direction be continued until the end contacts $a^4$ and $b^4$ or $a^5$ and $b^5$ be immersed in the mobile conductors, all of the rheostats will be cut out of the circuit and this further reduction of resistance will cause the motor to run still faster than under any of the previously noted conditions. Thus, assuming that the movement of the switches is to the left, so that the terminals $a^5$ and $b^5$ are immersed, the circuit will be as follows:—over wire 1, binding post 2, mobile conductor B', terminal $b^5$, wire 5, binding post 6, wire 7, brush 8, commutator $d$, brush 9, wire 10, binding post 11, wire 12, terminal $a^5$, mobile conductor A', binding post 16, wire 17, binding post 18, wire 19, magnet D', wire 20, binding post 21, and wire 22 to battery. And, if such movement of the switches be to the right, the current will traverse the following course, to wit: wire 1, binding post 2, mobile conductor B', terminal b⁴, wire 28, binding post 11, wire 10, brush 9, commutator d, brush 8, wire 7, binding post 6, wire 29, terminal a⁴, mobile conductor A', binding post 16, wire 17, binding post 18, wire 19, magnet D', wire 20, binding post 21 and wire 22 to battery.

It will be evident from the foregoing that not only is the speed and direction of the movement of the motor automatically regulated by the simple means hitherto described, but also that said means in the passing of the switch from the position in which the circuit is open to that in which all resistance is cut out, also operates to cut out the resistance gradually, and conversely in passing from the last named position to the inoperative one, gradually cuts in resistance, and if its movement be continued to the opposite side, it both reverses the direction of flow of the current through the motor and gradually cuts out resistance until the motor has attained the requisite speed proportionate to the extent of movement of the switches.

In the application of the principle and mechanism named, to the maintenance of tables or bunks, for example, level on shipboard, it will be apparent that the switches being responsive to the rolling movement of the vessel will automatically be tilted thereby towards the side which accords with such movement and to an extent proportionate thereto, thus causing the motor to be operated in the direction corresponding to the rolling movement of the vessel and rapidly if the movement be considerable, and slowly if it be slight; and further, causing the motor to stop when the vessel and consequently the switches attain a level position. Such movement of the motor, therefore, is adapted effectually to counteract the tendency of the table or bunk to tilt with the vessel, thus maintaining the same in level position, the advantages of which are apparent.

It will, of course, be understood that a series of tables or bunks may be connected with a single motor, if desired, and further that the system herein shown and claimed is not restricted in its usefulness to its employment as a means for maintaining such articles in level position, but in its entirety, or in respect of elements or parts included therein, may be otherwise employed without departing from the spirit of the invention. Moreover, as many changes may be made in the above described construction and many apparently widely different embodiments of the invention may be made without departing from the scope thereof, I intend that all matter contained in the description or shown in the accompanying drawings shall be interpreted as illustrative and not in a limiting sense. I desire it also to be understood that the language used in the following claims is intended to cover all of the generic and specific features of the invention herein set forth and all statements of the scope of the invention, which, as a matter of language, might be said to fall there between.

Having now described my invention, what I claim as new and desire to secure by Letters Patent is:

1. A system of control, comprising a source of electric energy, an electric motor in circuit therewith, and a pole changing gravity operating switch mechanism having means whereby it includes variable resistance in the circuit between the motor and source of energy.

2. A system of control, comprising a source of electric energy, an electric motor, partial circuits between the motor and source of energy, and a pole changing switch mechanism which is responsive to rolling movements and is adapted to be tilted thereby in either direction and to selectively and successively close partial circuits according with the direction of the tilting movement.

3. A system of control, comprising an electric motor, a source of electric energy therefor, a plurality of partial circuits arranged in operative relation with the motor and source of energy, prescribed resistance included in said circuits, and a gravity operated switching means adapted to open and close said circuits in automatic succession to produce a varying and directional flow of current according with the direction and extent of movement of said switching means.

4. A system of control, comprising an electric motor, a source of electric energy therefor, a plurality of partial circuits arranged in operative relation with the motor and source of energy, prescribed resistance included in said circuits, and a gravity actuable switching means having a plurality of terminals and a mobile conducting means adapted to open and close said circuits in automatic succession to produce a varying and directional flow of current according with the direction and extent of movement of said switching means.

5. A system of control, comprising an electric motor, a source of electric energy, circuit connections between the same, a plurality of series of resistances, each having a plurality of resistance elements adapted to be included in series in, and partially and wholly excluded from the circuit to the motor, successively, and a gravity operating pole changing switching mechanism provided with means whereby it controls the inclusion of said resistance elements.

6. A system of control, comprising an electric motor, a source of electric energy, circuit connections between the same, a plurality of series of resistances, each having a plurality of resistance elements adapted to be included in series in, and partially and wholly excluded from the circuit to the motor, successively, and a gravity actuable pole changing switching mechanism provided with means whereby it controls the inclusion of said resistance elements.

7. A system of control, comprising an electric motor, a source of electric energy, circuit connections between the same, a plurality of series of resistances, each having a plurality of resistance elements adapted to be included in series in, and partially and wholly excluded from the circuit to the motor, successively, and a gravity actuable pole changing switching mechanism provided with a mobile conducting means and the terminals of said circuit connections, whereby it controls the inclusion of said resistance elements.

8. A system of control, comprising an electric motor, a source of electric energy, circuit connections between the same, a plurality of series of resistances each having a plurality of resistance elements arranged in series, a partial shunt connection around one of each of said elements thus associated, and a gravity actuating pole changing switching mechanism provided with means whereby it controls the inclusion of the resistance elements.

9. A system of control, comprising an electric motor, a source of electric energy, circuit connections between the same, a plurality of series of resistances each having a plurality of resistance elements arranged in series, a partial shunt connection around one of each of said elements thus associated, and a gravity actuable pole changing switching mechanism provided with means whereby it controls the inclusion of the resistance elements.

10. A system of control, comprising an electric motor, a source of electric energy, circuit connections between the same, a plurality of series of resistances each having a plurality of resistance elements arranged in series, a partial shunt connection around one of each of said elements thus associated, and a gravity-actuable pole changing switching mechanism provided with mobile conducting means and terminals whereby it controls the inclusion of the resistance elements.

11. A system of control, comprising a gravity controlled switch mechanism mounted pivotally and adapted to be tilted in either direction, and provided internally with a mobile conductor and a plurality of terminals at each side of its center.

12. A system of control, comprising a pivotally mounted switch mechanism having a depending leg and terminals above the plane of the leg, and a mobile conductor adapted when the switch is tilted to flow from said leg and make contact with the terminals.

13. In a system of control, a switch mechanism, comprising a plurality of pivotally mounted and connected switches, each having a plurality of terminals and a mobile conductor therein.

14. In a system of control, a switch mechanism comprising a plurality of pivotally mounted and connected switches adapted to tilt in either direction and each provided internally with a mobile conductor and a plurality of terminals at each side.

15. In a system of control, a switch mechanism, comprising a plurality of pivotally mounted and connected switches, each having a depending leg and a set of terminals above and at each side of said leg, and a mobile conductor adapted to flow from said leg and make contact with either set of terminals.

16. In a system of control, a source of electric energy, a motor, circuit connections between the source of energy and motor, and a gravity controlled pole changer provided internally with a mobile conductor, said circuit connections having terminals through which the circuit is completed by said conductor.

17. In a system of control, a source of electric energy, a motor, circuit connections between the source of energy and motor, and a gravity controlled pole changer comprising a plurality of connected pivotally mounted switches, each provided internally with a mobile conductor, said circuit connections having terminals through which the circuit is completed by said conductor.

In witness whereof I have hereunto set my hand at the city, county and State of New York, this 31st day of January, 1907.

JOSEPH VARNUM MOTT.

In presence of—
ALLAN N. FOOSE,
JOHN J. RANAGAN.